United States Patent
McDonald et al.

(10) Patent No.: US 11,051,138 B1
(45) Date of Patent: Jun. 29, 2021

(54) METHOD AND SYSTEM FOR EXTENDING PUSH-TO-TALK SERVICE FROM LAND MOBILE RADIO SYSTEMS TO BROADBAND SYSTEMS

(71) Applicant: MOTOROLA SOLUTIONS, INC., Chicago, IL (US)

(72) Inventors: Daniel J. McDonald, Cary, IL (US); Svend Frandsen, Koege (DK); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/827,736

(22) Filed: Mar. 24, 2020

(51) Int. Cl.
| | |
|---|---|
| *H04W 4/10* | (2009.01) |
| *H04W 4/08* | (2009.01) |
| *H04W 76/45* | (2018.01) |
| *H04W 36/14* | (2009.01) |
| *H04W 12/069* | (2021.01) |
| *H04L 29/06* | (2006.01) |
| *H04W 84/08* | (2009.01) |
| *H04W 88/16* | (2009.01) |

(52) U.S. Cl.
CPC .............. *H04W 4/10* (2013.01); *H04W 4/08* (2013.01); *H04W 12/069* (2021.01); *H04W 36/14* (2013.01); *H04W 76/45* (2018.02); *H04L 69/08* (2013.01); *H04W 84/08* (2013.01); *H04W 88/16* (2013.01)

(58) Field of Classification Search
CPC ......... H04W 4/10; H04W 4/08; H04W 76/45; H04W 88/16; H04W 36/14; H04W 84/08
See application file for complete search history.

(56) References Cited

U.S. PATENT DOCUMENTS

| | | | |
|---|---|---|---|
| 9,001,703 B2 | 4/2015 | Kuehner | |
| 9,042,929 B2 | 5/2015 | Kuehner | |
| 9,930,560 B2 | 3/2018 | Wang et al. | |
| 2005/0233735 A1* | 10/2005 | Karaoguz | H04L 29/06027 |
| | | | 455/415 |
| 2016/0057051 A1* | 2/2016 | McAndrew | H04W 76/15 |
| | | | 370/392 |
| 2016/0119762 A1* | 4/2016 | Zhu | H04W 4/10 |
| | | | 370/312 |
| 2016/0227588 A1* | 8/2016 | Patel | H04W 92/02 |
| 2017/0231014 A1* | 8/2017 | Patel | H04W 76/45 |

* cited by examiner

*Primary Examiner* — Keith Ferguson
(74) *Attorney, Agent, or Firm* — John B. MacIntyre; Barbara R. Doutre

(57) ABSTRACT

A method and system for processing a Push To Talk (PTT) call at an alternate bearer gateway. The alternate bearer gateway is connected to a Land Mobile Radio (LMR) Core Network and a Broadband Network. The alternate bearer gateway receives a PTT message from either the LMR Core Network or the Broadband Network. The PTT message includes a talkgroup identifier and a message. When the PTT message is received from the LMR Core Network, the alternate bearer network determines at least one Broadband talkgroup member using the talkgroup identifier. The alternate bearer gateway sends the message to the Broadband talkgroup member via the Broadband Network. When the PTT message is received from the Broadband Network, the alternate bearer gateway sends the message to the LMR Core Network.

11 Claims, 5 Drawing Sheets

114

METHOD AND SYSTEM FOR EXTENDING PUSH-TO-TALK SERVICE FROM LAND MOBILE RADIO SYSTEMS TO BROADBAND SYSTEMS

BACKGROUND OF THE INVENTION

LMR (Land Mobile Radio) radio users sometimes roam out of coverage of their existing LMR systems. Examples of such roaming include going into a hospital, entering a large building, or moving into a remote area. It is desired that the radio users would still be able to maintain any call that they are a part of, even when outside of LMR coverage areas.

In addition, it is preferred that users are able to maintain their call without any interruption or additional steps required by the user. The user should not be aware of any switch in access technology.

Therefore a need exists for a method and system for extending service for LMR users when they move out of the coverage area of their LMR system.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
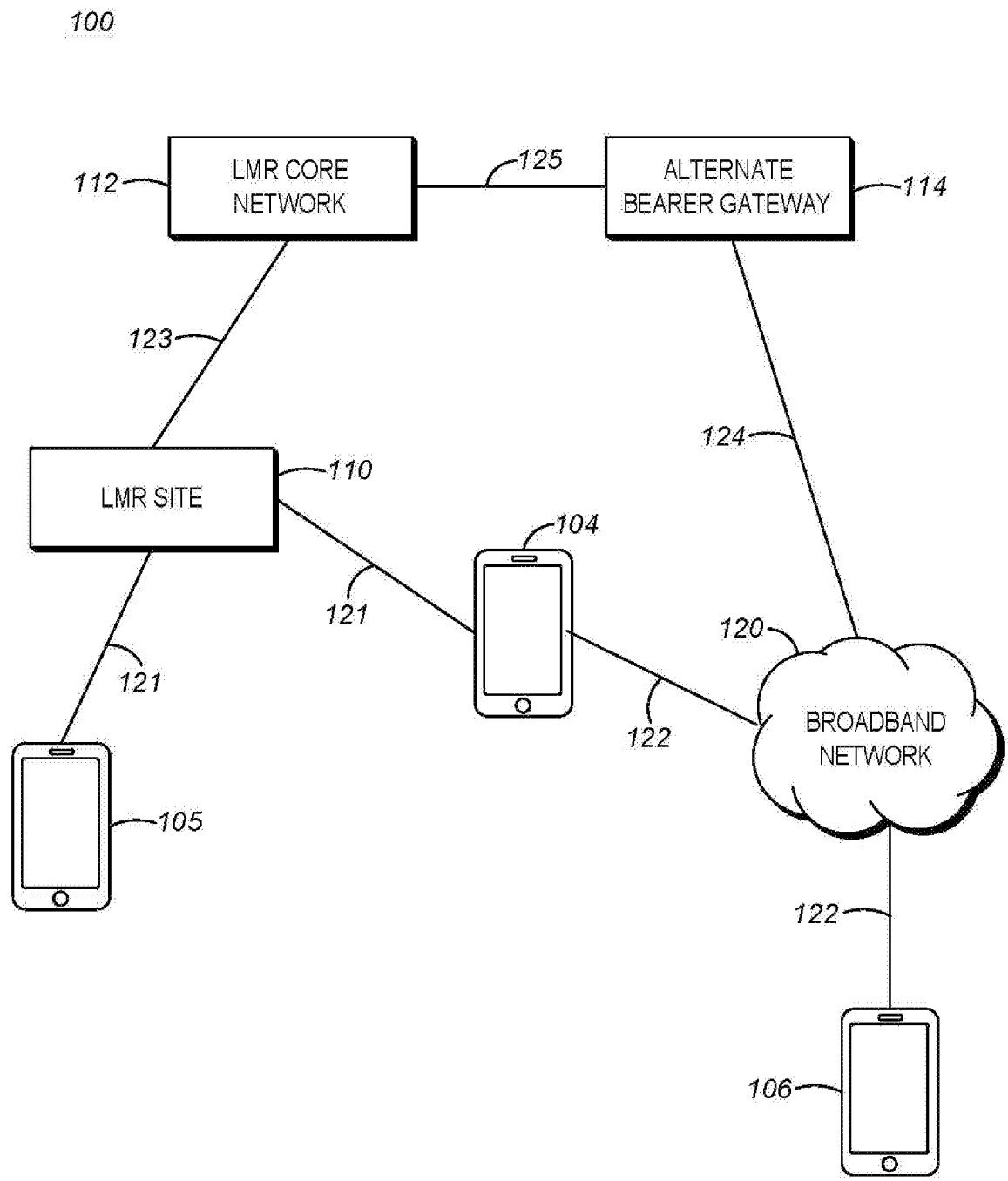
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

An exemplary embodiment provides solutions that extend service for Land Mobile Radio (LMR) users when they move out of the coverage area of their LMR system. In accordance with an exemplary embodiment, call control and audio are routed to and from LMR communication devices, commonly referred to as subscribers, that are located on broadband systems. The messages preferably use standard P25 messaging and audio structure. In an exemplary embodiment, the messages are modulated via, for example, Long-Term Evolution (LTE) unicast messaging.

In accordance with an exemplary embodiment, since LTE utilizes unicast operation, an alternate bearer gateway device is used to receive the call control and audio from the LMR network and unicast the call control and audio to each radio on the broadband network that is in the talkgroup that the call control or audio message was sent from.

In an exemplary embodiment, for calls originated from a communication device located at an LMR site, the alternate bearer gateway device maintains an affiliation table. The affiliation table preferably includes the radio ID and affiliated talkgroup and uses this information to determine the radio IDs of all talkgroup members who are currently located on a broadband system when a group call occurs. Upon receiving outbound call control and/or audio, the alternate bearer gateway device transports the P25 signaling and audio information over the broadband air interface to each of the talkgroup members who are currently located on a broadband system.

In an exemplary embodiment, for talkgroup messages that are originated by a communication device that is being served by a broadband network, the alternate bearer gateway device receives the unicast traffic from the communication device. The unicast traffic is preferably LMR information, for example P25 signaling and audio, that is encapsulated in LTE modulation. The alternate bearer gateway routes the P25 signaling and audio message into the LMR network.

Each of the above-mentioned embodiments will be discussed in more detail below, starting with example system and device architectures of the system in which the embodiments may be practiced, followed by an illustration of processing blocks for achieving an improved technical method, device, and system for extending Push-To-Talk service from land mobile radio systems to broadband systems. Exemplary embodiments are herein described with reference to flowchart illustrations, call flow diagrams, and/or block diagrams of methods, apparatus (systems) and computer program products according to exemplary embodiments. It will be understood that each block of the flowchart illustrations, call flow diagrams, and/or block diagrams, and combinations of blocks in the flowchart illustrations, call flow diagrams, and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart, call flow, and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 depicts a system diagram of a communication system 100 in accordance with an exemplary embodiment of the present invention. Communication system 100 includes an Land Mobile Radio (LMR) Site 110, LMR Core 112, an Alternate Bearer Gateway 114, Broadband Network 120, and communication devices 104, 105, and 106. The communication devices 104, 105, and 106 are sometimes referred to as subscriber units. Although only one LMR Site 110 and one Broadband Network 120 are depicted in FIG. 1, it should be understood that a typical communication system 100 would include a plurality of sites and networks, and that communication devices 104-106 could move about and connect to multiple of these plurality of sites as registered sites and adjacent sites. Connection 123 preferably connects LMR Site 110 and LMR Core Network 112. In an exemplary embodiment, Connection 123 includes both ALSLIP and XIS protocols. The ALSLIP interface is used to route call control messages, such as PTT request messages, PTT grant messages, and affiliation messages, between a site controller of LMR Site 110 and the site's Zone Controller located within LMR Core Network 112. The XIS interface carries payload, such as audio and data payload, between LMR Site 110 and the Zone Controller located within LMR Core Network 112. Connection 124 connects Broadband Network 120 to Alternate Bearer Gateway 114. In an exemplary embodiment, Connection 124 utilizes the XIS protocol for payload, such as audio and data payload, and P25 messages for call control messages. Alternate Bearer Gateway 114 receives the ALSLIP messages, which are preferably call control from LMR Core Network 112, and converts them to P25 messages and unicasts P25 messages to each radio in the talkgroup when a call is started. Connection 125 connects LMR Core Network 112 to Alternate Bearer Gateway 114, preferably using ALSLIP for control messages and XIS for audio messages.

In this exemplary embodiment, communication devices 104-106 connect to LMR Site 110 via narrowband links 121 and to Broadband Network 120 via broadband links 122. In accordance with an exemplary embodiment, the preferred connection is a connection with LMR Site 110.

LMR Site 110 handles data traffic and includes a network of base stations (not shown), each of which functions as a base station for LMR Core 112. LMR Site 110 uses the base stations to forward user data and signaling between LMR Core Network 112 and communication devices 104-106. The data traffic includes data, audio, and payload data such as location data.

LMR Core 112 preferably includes multiple sites in addition to LMR Site 110, although only site 110 is show in FIG. 1 for clarity. LMR Core 112 preferably includes a Zone Controller (ZC), a PM, a Unified Endpoint Management (UEM), and a Link Management Protocol (LMP). LMR Core 112 also includes a Mobility Management Entity (MME) that is in charge of functions related to end-user authentication and a deployable home subscriber server for storing user-related and subscription-related information to LMR Core 112 to successfully complete network entry authentication of communication devices.

Alternate Bearer Gateway 114 is a network element that preferably resides in a cloud network. Alternate Bearer Gateway 114 preferably maintains a secure connection to communication devices 104, 105, and 106. In addition, Alternate Bearer Gateway 114 preferably converts ALSLIP messages to P25 TSBKs (Trunking Signaling Blocks). In accordance with an exemplary embodiment, Alternate Bearer Gateway 114 duplicates and routes control messages and audio messages to talkgroup members.

Broadband Network 120 is a communication network that sends and receives control and audio messages to and from connected communication devices 104 and 106. Broadband Network 120 also sends control and audio messages to and from Alternate Bearer Gateway 114. Broadband Network 120 can be, for example, an LTE (Long-Term Evolution) network, a Wi-Fi network, or a satellite.

Communication devices 104, 105, and 106 are portable electronic communication devices that can be used for sending voice or data to other communication devices. Communication devices 104-106 are preferably capable of operating simultaneously over narrowband and broadband connections.

Figure 2:
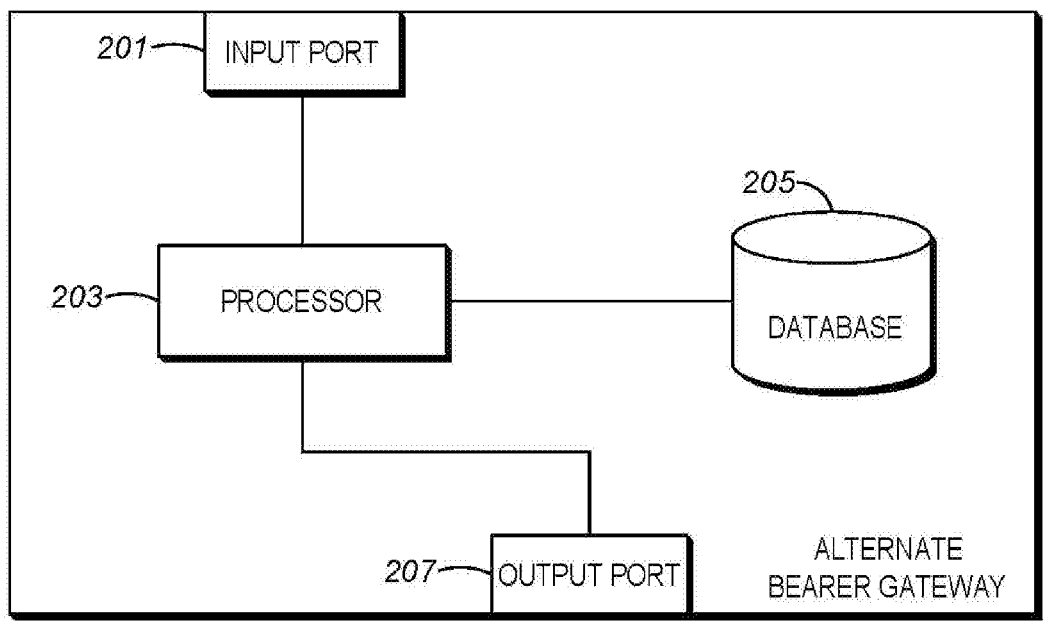
FIG. 2 depicts a schematic diagram of an alternate bearer gateway in accordance with an exemplary embodiment of the present invention.

FIG. 2 depicts a schematic diagram of Alternate Bearer Gateway 114 in accordance with an exemplary embodiment of the present invention. In the exemplary embodiment depicted in FIG. 2, Alternate Bearer Gateway 114 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from LMR Core Network 112 and Broadband Network 120. Output port 307 transmits signals and messages to LMR Core Network 112 and Broadband Network 120. Input port 201 and output port 207 are electrically connected to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium. The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the method of FIG. 3.

Figure 3:
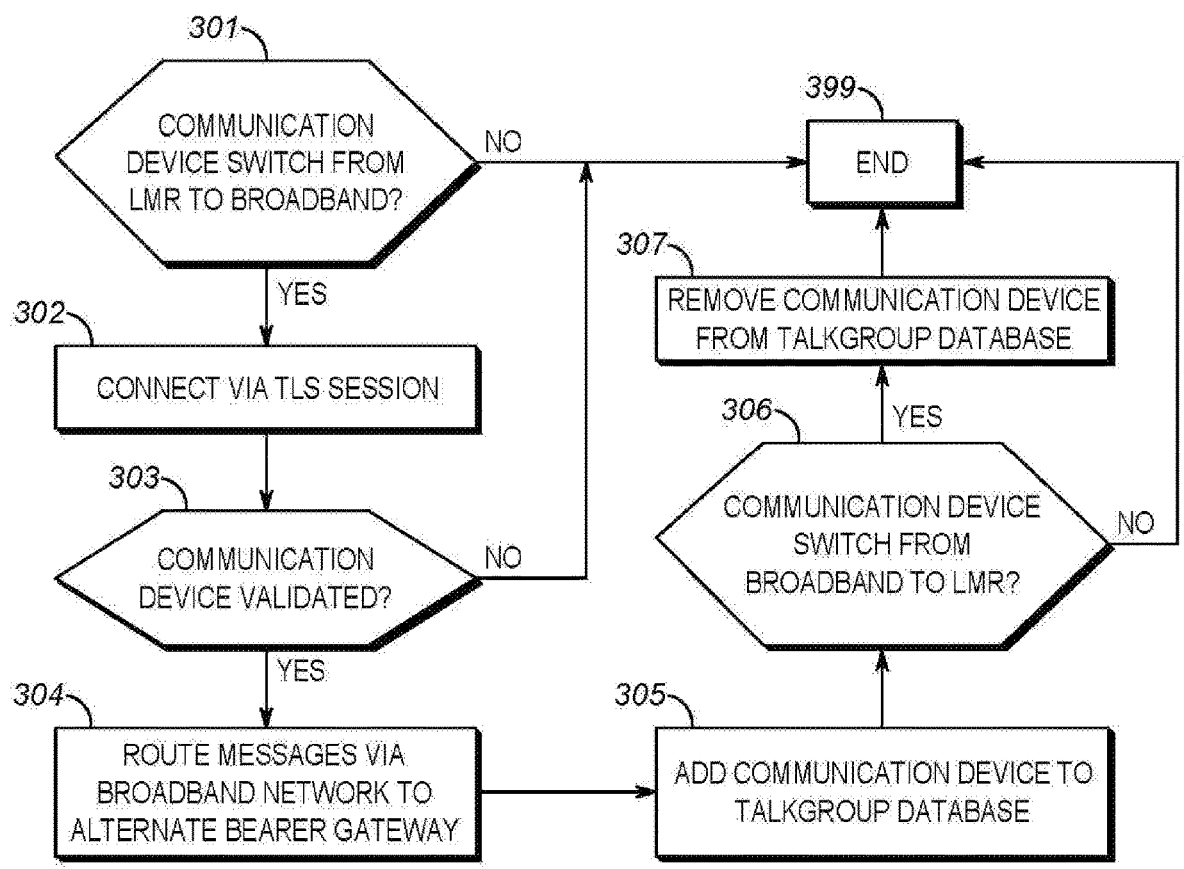
FIG. 3 depicts a flow chart in accordance with an exemplary embodiment of the present invention.

FIG. 3 depicts a flow chart 300 of a method for extending PTT service to include users on both LMT and broadband systems in accordance with an exemplary embodiment of the present invention.

LMR Core Network 112 determines (301) whether a communication device has switched from LMR Core Network 112 to Broadband Network 120. If the communication device has not switched, the process ends (399).

If a communication device has switched from LMR Core Network 112 to Broadband Network 120, the communication device preferably connects (302) to Broadband Network 120 via a Wi-Fi or LTE connection. The Wi-Fi or LTE connection establishes a TLS (Transport Layer Security) session over Broadband Network 120 with Alternate Bearer Gateway 114. In accordance with an exemplary embodiment, the communication device and Alternate Bearer Gateway 114 exchange certificate information to determine if the communication device is a valid device.

Alternate Bearer Gateway 114 determines (303) if the communication device is validated. If not, the process ends (399). If the communication device is validated, the communication device preferably routes (304) messages via Broadband Network 120 To Alternate Bearer Gateway 114 and ultimately to LMR Core Network 112. In an exemplary embodiment, the messages are ultimately routed to a zone controller within LMR Core Network 112.

Alternate Bearer Gateway 114, upon receiving the registration/affiliation message from the communication device, adds (305) the communication device to a talkgroup database. The talkgroup database preferably includes a record for each talkgroup, and within each record is an identification of each communication device that is in that talkgroup that is currently receiving service from Broadband Network 120. This database is used in routing messages and information to individual members of a talkgroup who are located at a broadband network, such as Broadband Network 120.

LMR Core Network 112 determines (306) if a communication device that has been added to the talkgroup database has switched from the broadband network to the LMR network. If not, the process ends (399). If a communication device has switched from the broadband network to the LMR network, LMR Core Network alerts Alternate Bearer Gateway 114, which removes (307) the communication device from the talkgroup database. The process then ends (399).

Figure 4:
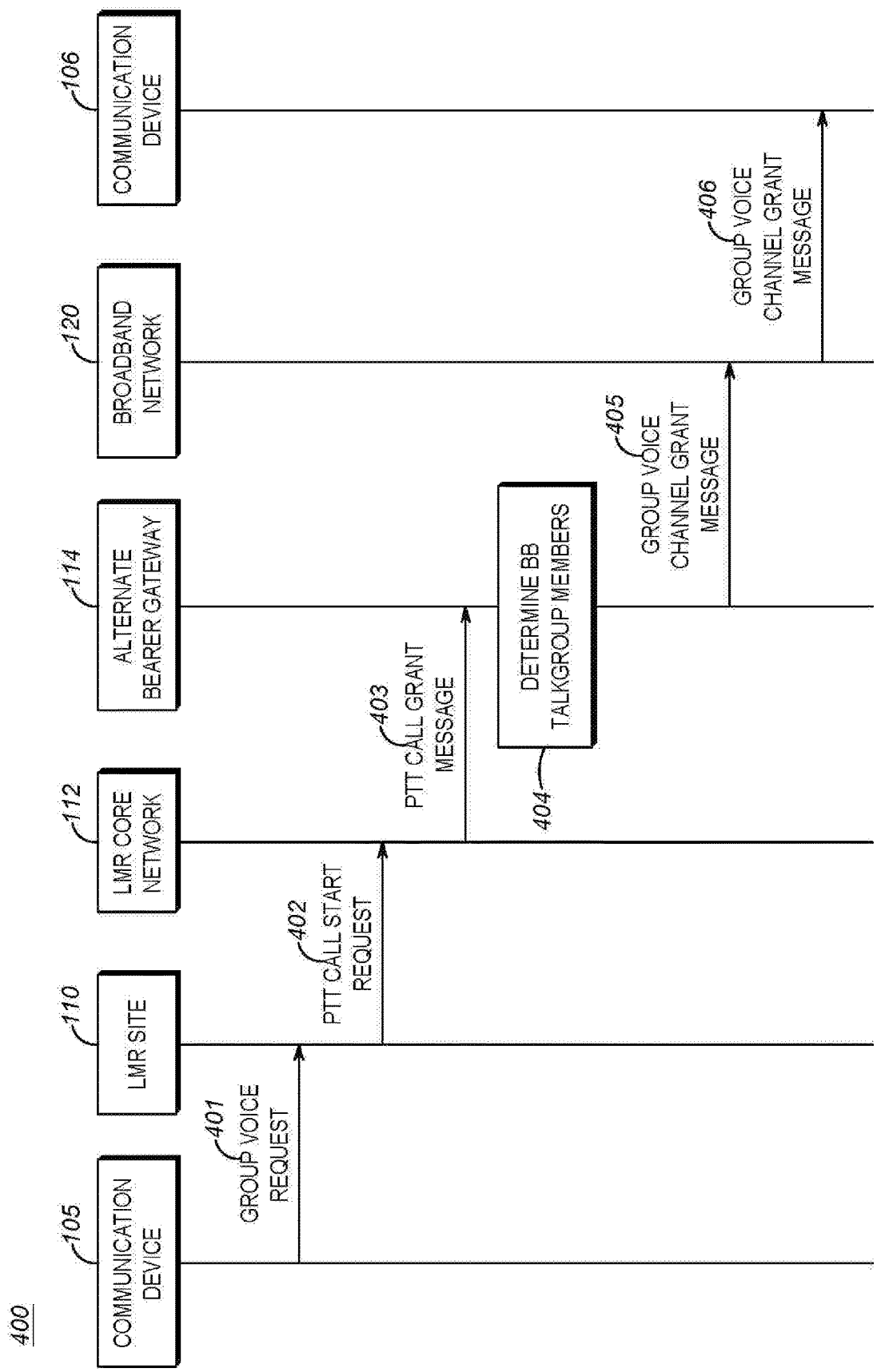
FIG. 4 depicts a call flow diagram in accordance with an exemplary embodiment of the present invention.

FIG. 4 depicts a call flow diagram 400 of a method for sending a PTT call request to all members of the talkgroup, including talkgroup members who are being served by an LMR network and those who are being served by a broadband network, in accordance with an exemplary embodiment of the present invention.

Communication device 105 sends PTT Call Start Request message 401 to LMR Site 110. PTT Call Start Request message 401 preferably includes a talkgroup identifier and a message.

LMR Site 110 sends PTT Call Start Request message 402 to LMR Core Network 112. PTT Call Start Request message 402 preferably includes the talkgroup identifier and the message.

LMR Core Network 112 sends PTT Call Grant Message 403 to Alternate Bearer Gateway 114. PTT Call Grant Message 403 preferably includes the talkgroup identifier and the message. In accordance with an exemplary embodiment, LMR Core Network 112 includes Alternate Bearer Gateway 114 into this call request and routes call control and audio information to Alternate Bearer Gateway 114.

Alternate Bearer Gateway 114 determines (404) which broadband communication devices are members of the talkgroup. In accordance with an exemplary embodiment, Alternate Bearer Gateway 114 accesses the Talkgroup Database to determine which communication devices in the talkgroup are currently being served by a broadband network.

Alternate Bearer Gateway 114 sends Group Voice Channel Grant Message 405 to Broadband Network 120. For the sake of simplicity, only one communication device 106 is depicted in FIG. 1, and only one broadband network 20 is depicted. It should be understood that Broadband Network 120 could be serving multiple communication devices. It should also be understood that there could be a plurality of broadband networks in communication system 100. In the exemplary embodiments with multiple broadband networks, Alternate Bearer Gateway 114 would send a unicast PTT Message to each communication device that is in the talkgroup and on a broadband network. In accordance with this exemplary embodiment, Group Voice Channel Grant Message 405 includes an identification of the communication device that is a member of the talkgroup and also the message, which could be a control message or audio.

Broadband Network 120 sends PTT Message 406 to Communication Device 106. PTT Message 406 is preferably a unicast message. In the exemplary embodiment where there are multiple communication devices located at Broadband Network 120 that are members of the talkgroup, Broadband Network 120 would send a unicast PTT Message to each of the communication devices.

Figure 5:
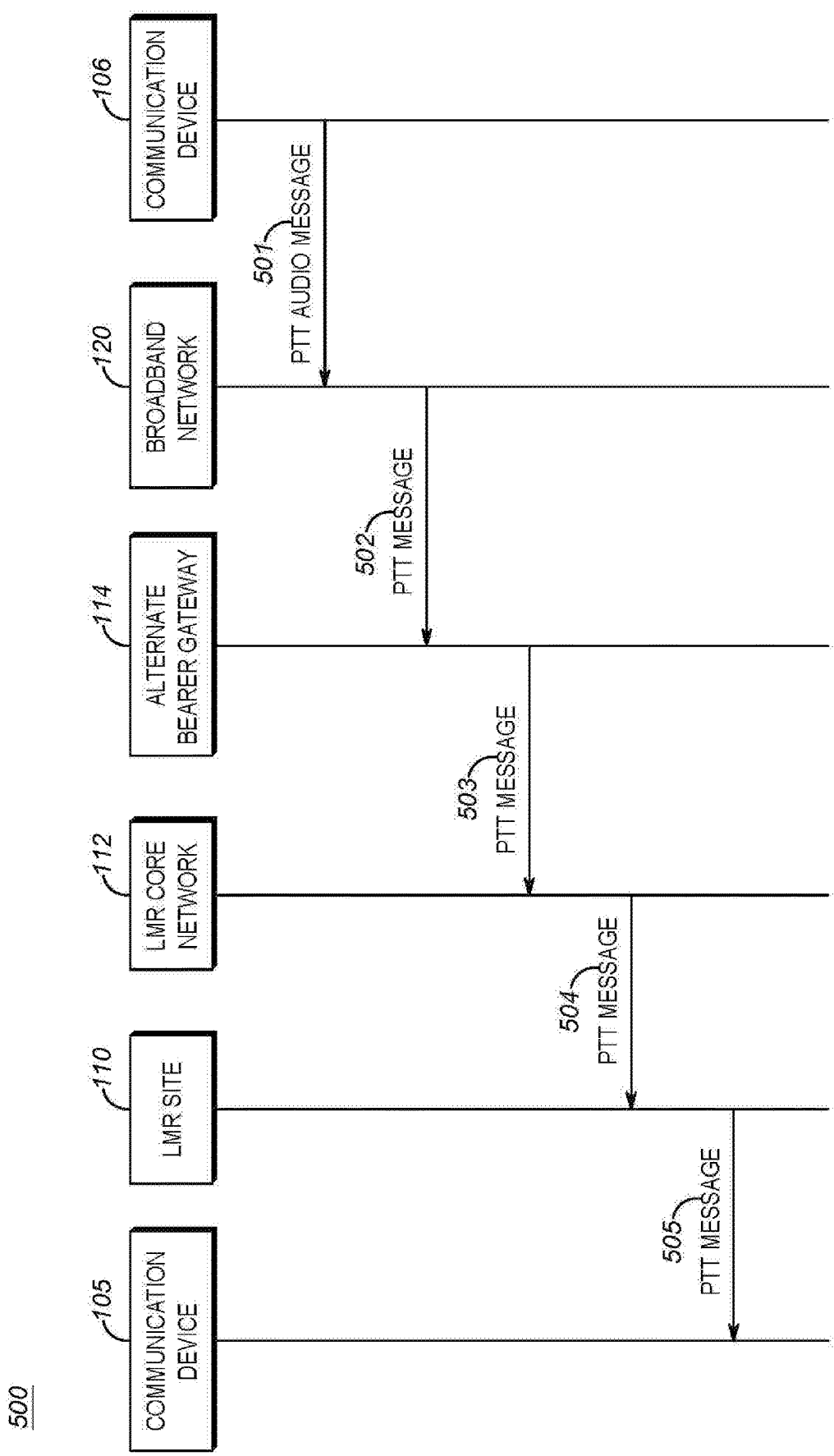
FIG. 5 depicts a call flow diagram in accordance with an exemplary embodiment of the present invention.

FIG. 5 depicts a call flow diagram 500 of a method for sending a PTT audio message from a talkgroup member located at a broadband network. FIG. 5 depicts the call flow of the PTT message as it goes from cm device 106, which is located at a broadband network, to communication device 105, which is located at an LMR network.

Communication Device 106 sends PTT Audio Message 501 to Broadband Network 120. PTT Audio Message 501 preferably includes a talkgroup ID and an audio portion.

Broadband Network 120 sends PTT Message 502 to Alternate Bearer Gateway 114. In accordance with an exemplary embodiment, Broadband Network 120 recognizes PTT Message 501 as a talkgroup call message and therefore sends a corresponding message to Alternate Bearer Gateway 114.

Alternate Bearer Gateway 114 receives PTT Message 502, and recognizing it as a talkgroup call sends PTT Message 503 to LMR Core Network 112.

LMR Core Network 112 receives PTT Message 503 and determines that some members of the talkgroup included in PTT Message 503 are located at LMR sites. Accordingly, LMR Core Network 112 sends PTT Message 504 to LMR Site 110.

LMR Site 110 sends PTT Message 505 to Communication device 105. PTT Message 505 is preferably broadcast from LMR Site 110, such that any communication devices that are members of the talkgroup will receive PTT Message 505.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method for processing a Push To Talk (PTT) call at an alternate bearer gateway, the alternate bearer gateway connected to a Land Mobile Radio (LMR) Core Network and a Broadband Network, the method comprising:
　receiving a PTT message at the alternate bearer gateway from either the LMR Core Network or the Broadband Network, the PTT message including a talkgroup identifier and a message;
　when the PTT message is received from the LMR Core Network:
　　determining at the alternate bearer gateway at least one Broadband talkgroup member using the talkgroup identifier; and
　　sending the message to the at least one Broadband talkgroup member via the Broadband Network, wherein the message is sent as a unicast message, and the unicast message is a P25 Trunking Signaling Block (TSBK); and
　when the PTT message is received from the Broadband Network, sending the message to the LMR Core Network.

2. The method of claim 1, wherein the step of determining at least one Broadband talkgroup member using the talkgroup identifier comprises accessing a talkgroup database coupled to the alternate bearer gateway.

3. The method of claim 2, wherein the talkgroup database includes a plurality of talkgroup records, each of the plurality of talkgroup records including an identification of each communication device that is in that talkgroup.

4. The method of claim 1, the method further comprising the step of, prior to sending the message to the LMR Core Network, converting the PTT message to an LMR infrastructure signaling protocol.

5. A method for processing a Push To Talk (PTT) call at an alternate bearer gateway, the alternate bearer gateway connected to a Land Mobile Radio (LMR) Core Network and a Broadband Network, the method comprising: detecting when the communication device switches from the LMR Core Network to the Broadband Network; sending a message to at least one Broadband communication device via the Broadband Network, wherein the message is sent as a unicast message, and the unicast message is a P25 Trunking Signaling Block (TSBK); validating the communication device; receiving a registration message from the communication device at the alternate bearer gateway, the registration message being received as a unicast P25 message; and adding the communication device to a database operably coupled with the alternate bearer gateway.

6. The method of claim 5, wherein the step of validating the communication device comprises exchanging certificate information between the communication device and the alternate bearer gateway.

7. The method of claim 5, the method further comprising
　detecting when the communication device switches from the Broadband Network to the LMR Core Network; and
　removing the communication device from the talkgroup database.

8. An alternate bearer gateway for processing a Push To Talk (PTT) call, the alternate bearer gateway connected to a Land Mobile Radio (LMR) Core Network and a Broadband Network, the alternate bearer gateway comprising:
　an input port for receiving a PTT message from either the LMR Core Network or the Broadband Network, the PTT message including a talkgroup identifier and a message;
　a processor for performing, when the PTT message is received from the LMR Core Network, determining at least one Broadband talkgroup member using the talkgroup identifier; and
　an output port for transmitting:
　　when the PTT message is received from the LMR Core Network, sending the message as a unicast message, wherein the unicast message is a P25 Trunking Signaling Block (TSBK), to the at least one Broadband talkgroup member via the Broadband Network; and
　　when the PTT message is received from the Broadband Network, sending the message to the LMR Core Network.

9. The alternate bearer gateway of claim 8, wherein the processor step of determining at least one Broadband talkgroup member using the talkgroup identifier comprises the processor accessing a talkgroup database coupled to the alternate bearer gateway.

10. The alternate bearer gateway of claim 9, wherein the talkgroup database includes a plurality of talkgroup records, each of the plurality of talkgroup records including an identification of each communication device that is in that talkgroup.

11. The alternate bearer gateway of claim 8, the processor further converting the PTT message to an LMR infrastructure signaling protocol prior to sending the message to the LMR Core Network.

* * * * *